Oct. 7, 1941.        H. H. GORRIE         2,257,905
              MEASURING AND CONTROLLING APPARATUS
              Filed Sept. 11, 1937    2 Sheets-Sheet 1

Inventor
HARVARD H. GORRIE
By Raymond W. Jenkins,
Attorney

Oct. 7, 1941.     H. H. GORRIE     2,257,905
MEASURING AND CONTROLLING APPARATUS
Filed Sept. 11, 1937     2 Sheets-Sheet 2

Inventor
HARVARD H. GORRIE
By Raymond W. Jenkins,
Attorney

UNITED STATES PATENT OFFICE 2,257,905

MEASURING AND CONTROLLING APPARATUS

Harvard H. Gorrie, Cleveland Heights, Ohio, assignor to Bailey Meter Company, a corporation of Delaware Application September 11, 1937, Serial No. 163,448

15 Claims. (Cl. 235—61)

This invention relates to apparatus for measuring and/or controlling the ratio between two variables which may be for example, pressures, temperatures, rate of flows, electromotive forces or any other physical, chemical or electrical conditions or quantities. In any particular instance the variables may be the same, that is they may both be pressures for example, or they may be unlike, one being a pressure and the other a temperature. The invention is equally applicable to the determination of the ratio between two abstract quantities, such as two numbers or mathematical functions; or between an abstract quantity and a variable as will be apparent from the description to follow.

In accordance with my invention a member is displaced from an initial position in accordance with the magnitude of each variable and the ratio between the displacements of the members determined.

Further in accordance with my invention a control effect such as a fluid pressure or electric impulse is established in dependence upon the ratio existing between the two variables, and my invention further contemplates utilizing the effect so established to actuate a control to maintain the variables in predetermined or desired ratio.

Figure 1:
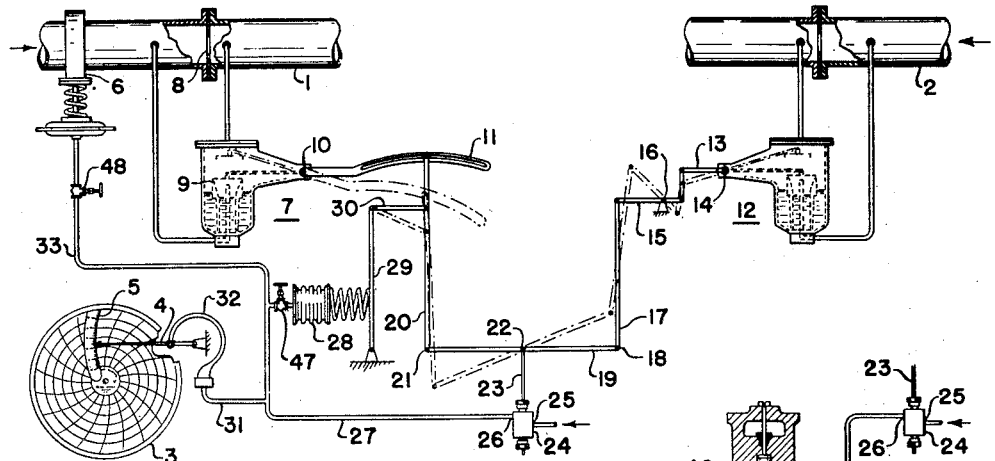
Fig. 1 illustrates diagrammatically a particular embodiment of my invention.

Referring to Fig. 1, I have therein shown my invention specifically applied to the determination and control of the ratio of the rate of flow of a first fluid passing through a conduit 1 in the direction of the arrow, to the rate of flow of a second fluid passing through a conduit 2 in the direction of the arrow. The actual ratio existing between the rates of flow of the first and second fluids is recorded on a chart 3, rotated by a suitable clock mechanism (not shown), by an index 4 and is further indicated thereby in cooperation with a suitably graduated scale 5.

The rate of flow of the first fluid through the conduit 1 may be controlled by a spring loaded valve 6 to maintain substantially constant the ratio between the two rates of flow. Thus in the embodiment shown the second fluid flowing through the conduit 2 may be considered as the independent variable and the first fluid as the dependent variable. It will be apparent, however, that either or neither fluid may be controlled in conformance with the particular conditions pertinent to any given application, or that one fluid may be controlled indirectly as by heating, cooling or by varying the rate of application of an agent, or agents, producing or maintaining the flow of fluid.

It is, of course, evident that in many cases a control will be unnecessary and the apparatus hereinafter described utilized merely to exhibit the ratio existing between two independent variables.

The rate of flow of fluid through the conduit 1 is measured by a rate of flow meter generally indicated at 7 sensitive to the differential produced by a primary element herein shown as an orifice 8. The meter 7 is illustrated as being of the type described in United States Patent 1,064,748 dated June 17, 1913, to J. W. Ledoux. Therein the differential pressure established by the orifice 8 is impressed across a liquid sealed bell 9 having walls of material thickness and so shaped that the vertical displacement of the bell from an initial position is directly proportional to the rate of flow of fluid and bears a non-linear functional relation to the differential pressure.

Angularly positioned by the bell 9 about a spindle 10 is an arcuately slotted drive arm 11. The arrangement is such that as the flow through the conduit 1 increases the arm 11 is positioned downwardly in direct proportion thereto.

The rate of flow of the second fluid through the conduit 2 is measured by a meter generally indicated at 12 similar to the meter 7 and acts to angularly position a drive arm 13 about a spindle 14. The arm 13 positions a lever 15 about a pivot 16, the arrangement being such that as the flow through the conduit 2 increases the lever 15 is positioned in a clockwise direction.

Pivotally connected to the link 15 is a depending link 17 pivoted at 18 to a differential link 19. Carried in the slot of the drive arm 11 is a link 20 which is pivotally connected at 21 to the differential link 19.

When the flow through the conduit 1 increases the drive arm 11 is positioned in a clockwise direction a proportionate amount, thereby causing the link 19 to be positioned a proportionate amount in a counterclockwise direction about the pivot 18 as a center. If the flow through the conduit 2 increases, the differential link 19 will be positioned in a counterclockwise direction a proportionate amount about the pivot 21 as a center. As indicated by the dotted line, if the flows through the conduits 1 and 2 increase identical amounts, then the mid point 22 of the differential link 19 will remain stationary. If the flow through the conduit 2 increases a greater amount than that through the conduit 1, then the mid point 22 will move upwardly a proportionate amount and conversely if the flow through the conduit 1 increases a greater amount than the flow through the conduit 2, then the mid point 22 will be positioned downwardly from the position shown a proportionate amount.

Generally speaking therefore, the differential link 19 acts to determine the difference existing between the rate of flow of fluid within the conduit 1 and that within the conduit 2 and the midpoint thereof will assume a position in dependence upon the difference existing between said flows.

The arcuate slot in the arm 11 is preferably so curved that when there is no flow through the pipe 1, the link 20 may be moved throughout the length of the slot without disturbing the vertical position of the point 22 of the differential link 19. When flow exists through the conduit 1, however, movement of the link 20 in the slot will produce a proportionate shifting of the vertical position of the point 22. As the link 20 is moved toward the spindle 10 the point 22 will rise, and as it is moved away the point 22 will fall. The amount the vertical position of the point 22 will be shifted for a given change in the radial distance between the link 20 and spindle 10 will depend upon the angular displacement of the arm 11 from its position corresponding to zero flow through the conduit 1.

If the link 20 is shifted relative to the arm 11 to maintain the mid point 22 in a given vertical position, then the radial distance between the spindle 10 and link 20 is a measure of the ratio between the existing rates of flow in the conduits 1 and 2, as may be illustrated mathematically as follows:

A = radial distance from spindle 10 to link 20
B = effective radial distance of drive arm 13 and lever 15
$F_A$ = per cent of max. travel of meter 7
$F_B$ = per cent of max. travel of meter 12

Then when mid-point 22 is in predetermined position:

$$F_A A = F_B B$$

and $$A = B \frac{F_B}{F_A}$$

but B = a constant therefore $$A = K \frac{F_B}{F_A}$$

This mathematical analysis is given merely as an aid to an understanding of the principles of the invention and not as a rigid analysis for design purposes. It may be stated, however, that it is usually possible to confine the angular displacement of the various moving members to the region wherein the sine of the angle through which they have rotated is directly proportional to the angle itself, thereby rendering the so-called angularity effect negligible. However it will be apparent that the analysis here given may be properly modified when applied to any specific instance to include such ancillary factors as may be necessary.

My invention contemplates continuously and automatically varying the radial distance between the spindle 10 and link 20 so that the point 22 is maintained in a predetermined or established position and utilizing a measure of this radial distance as a measure of the ratio between the rates of flow within the conduits 1 and 2.

Referring once more to Fig. 1, I show connected to the point 22 a movable valve member 23 of a pilot valve 24 shown as being of the type described in United States Patent Serial No. 2,054,464 dated September 15, 1936, to Clarence Johnson. A suitable pressure fluid, such as compressed air is admitted to the valve 24 through an inlet port 25, and serves to establish in co-operation with the valve member 23 a loading pressure at an outlet port 26 proportional to the position of the valve member 23 and accordingly proportional to the position of the point 22. The loading pressure so established is transmitted through a pipe 27 to a spring loaded servo-motor 28 arranged to position the link 20 through a lever 29 and a connecting link 30. As the pressure in the servo-motor 28 increases the link 20 is moved to the right as viewed in the drawing, and conversely decreases in pressure within the servo-motor 28 cause proportionate movements of the lever 20 to the left.

If the flow through the conduit 2 increases above that through the conduit 1, then the point 22 will be positioned upwardly and the fluid pressure established by the pilot valve 24 will increase, causing the link 29 to be shifted to the right until the point 22 is restored to substantially the same position as it occupies previous to the change. Conversely, if the flow of fluid through the conduit 1 increases above that through the conduit 2, the point 22 will be positioned downwardly and the pressure established by the pilot 24 will decrease, thereby causing the link 20 to be positioned to the left until the point 22 is moved to the established position.

In the embodiment of my invention as shown in Fig. 1, I utilize the pressure of the fluid within the conduit 27 as a measure of the radial distance between the spindle 10 and link 20, and accordingly as a measure of the ratio between the rate of flow of fluid within the conduits 1 and 2. A branch connection 31 of the pipe 27 terminates in a Bourdon tube 32, the free end of which positions the index 4 so that it is moved relative to the chart 3 and scale 5 in proportion to changes in the ratio.

In some applications it may be desirable to control the rate of flow of one of the fluids to maintain a substantially constant ratio. In Fig. 1 I accomplish this by transmitting the pressure established by the pilot 24 through a branch conduit 33 to the spring loaded diaphragm actuated valve 6 arranged to regulate the rate of flow of fluid through the conduit 1. The valve 6 may be arranged so that when the ratio of flows through the conduits 1 and 2 change it will modify the flow through the conduit 1 in a direction tending to restore the original proportionality.

If it is desired to control the ratio to a predetermined value, then the servo-motor 28 may be locked in a given position by closing a hand valve 47. Thereafter upon changes in ratio the valve 6 will be positioned to restore the ratio determined by the existing position of the link 20 relative to the drive arm 11. With this arrangement, movements of the index 4 occurring simultaneously with movements of the valve 6, will indicate departures of the actual ratio from that desired.

If it is desired to merely record the ratio between two variables then the valve 6 may be maintained at predetermined position by closure of a hand valve 48. Thereafter changes in ratio will serve merely to actuate the index 4 and link 20. Simultaneous operation of the measuring and control apparatus is obtained as hereinbefore described with the valves 47 and 48 open.

Figure 2:
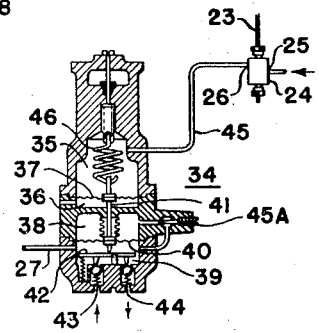
Fig. 2 is a modification which may be incorporated in the embodiment of my invention shown in Fig. 1.

To improve the sensitivity and responsiveness of the apparatus I may in some cases find it advisable to incorporate in my invention the modification shown in Fig. 2. Therein there is interposed between the pilot valve 24 and pipe 27 a standardizing relay 34 of a type described in United States Patent No. 2,098,914, dated November 9, 1937, by H. H. Gorrie. The relay 34 comprises a pair of chambers 35 and 36 separated by a pressure sensitive diaphragm 37, and a second pair of chambers 38 and 39 separated by a pressure sensitive diaphragm 40. The diaphragms 37 and 40 are connected by a movable member 41, which serves to position a fulcrumed valve actuator 42 controlling a pressure fluid inlet valve 43 and exhaust valve 44.

Pressures established by the pilot 24 are transmitted to the chamber 35 through a pipe 45. Changes in pressure within the chamber 35 produce immediate and proportional changes within the chamber 39 through selective operation of the inlet valve 43 or exhaust valve 44. Thus for example upon an increase in pressure of given amount within the chamber 35 the movable member 41 moves downwardly, causing the inlet valve 43 to open. When the pressure in the chamber 39 has increased a proportionate amount the member 41 will be moved upwardly, or restored to its neutral position when the valve 43 will close. Decreases in pressure within the chamber 35 produce a converse action, the exhaust valve 44 opening until the pressure within the chamber 39 has reduced a proportionate amount.

Pressures within the chamber 39 are transmitted to the Bourdon tube 32, servo-motor 28 and valve 6 through the pipe 27 and branch conduits as hereinbefore described. The valves 43 and 44 are of ample capacity so that movements of the valve stem 23 will effect immediate and proportionate changes in pressure within the Bourdon tube 32, servo-motor 28 and valve 6 regardless of their capacity.

To further increase the accuracy with which the link 20 is positioned in the slotted arm 11, I show the chamber 39 connected to the chamber 38 through a bleed valve 45A. With this arrangement in order for the valves 43 and 44 to be restored to the neutral position it is necessary that the pressure within the chamber 35 be restored to a predetermined value, which through the agency of a manually adjustable spring 46 is made that pressure established by the pilot valve 24 when the point 22 is in the predetermined or established position. In other words the bleed connection 45 and chamber 38 acts to produce a continuous change in pressure within the chamber 39 until the point 22 is restored to the established position.

Figure 3:
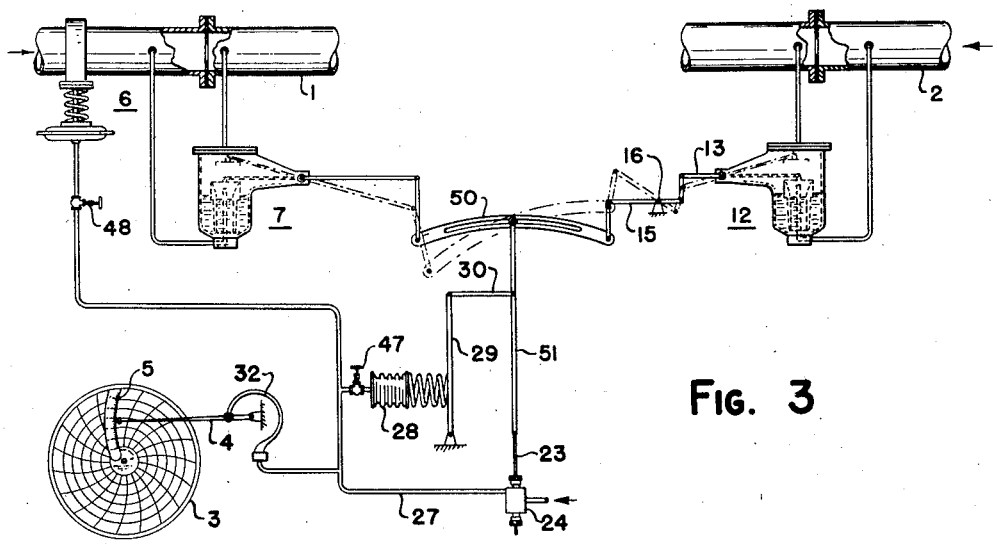
Fig. 3 is a diagrammatic illustration of a further embodiment of my invention.

In Fig. 3 is shown a modified form of my invention wherein the meters 7 and 12 position opposite ends of a slotted arcuate link 50. As indicated by means of dotted lines so long as the flows through the conduits 1 and 2 remain equal, the mid point of the link 50 will remain in the same position. However, if the flows are different then some other point in the link 50 will occupy the vertical position assumed by the mid point when the flows are equal. The position of the point occupying this established vertical position along the link 50 is then a measure of the ratio existing between the flows through the conduits 1 and 2.

To determine the point along the link 50 occupying the established or predetermined position I show carried by the link 50 a depending member 51 to the lower end of which is pivotally connected the movable valve member 23 of the pilot valve 24. So long as the flows through the conduits 1 and 2 remain equal a predetermined loading pressure will be established by the pilot valve 24, which is transmitted through the pipe 27 to the servo-motor 28. When the flows through the conduits 1 and 2 depart from a ratio of unity then the fluid pressure established by the pilot 24 will be modified a proportionate amount and vary the loading pressure transmitted to the servo-motor 28, thereby causing the member 51 to be positioned in the arcuate slot of link 50 until the loading pressure is restored to the predetermined value, which will occur when the member 51 has been moved to the same vertical position which it occupied previous to the deviation in ratio.

As described with reference to Fig. 1 the loading pressures established by the pilot 24 are utilized to position an index 4 and may also be utilized to actuate the spring loaded valve 6 to maintain a predetermined ratio between the flows within the conduits 1 and 2.

Figure 4:
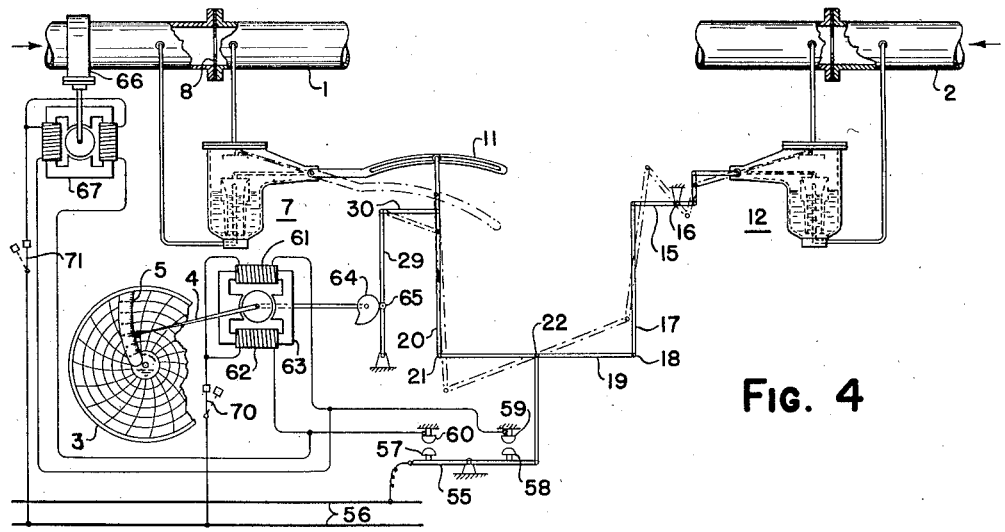
Fig. 4 illustrates diagrammatically another modified form of my invention.

In Fig. 4 I show a further modified form of my invention, which in some aspects is similar to the embodiment shown in Fig. 1, but utilizing electrical means to position the link 20 rather than fluid pressure actuated means. In Fig. 4 I show the mid point 22 of link 19 pivotally connected to a fulcrumed contact lever 55. The lever 55 is connected to a suitable source of current 56 and carries contacts 57 and 58.

Departure of the mid point 22 in an upward direction from the established position causes the contact 58 to engage a contact 59. Conversely upon departure of the mid point 22 in a downward direction the contact 57 engages a contact 60. Contacts 59 and 60 are connected to the opposed windings 61 and 62 of a self-starting synchronous motor 63. Energization of the winding 61 causes the rotor of motor 63 to rotate in one direction whereas energization of winding 62 causes the rotor to rotate in the opposite direction. Energization of the windings 61 and 62 is effected through closure of contacts 58—59 and 57—60 respectively.

The motor 63 through a suitable self-contained gear reduction positions a cam 64 bearing against a pin 65 carried by the lever 29. When, for example, the mid point 22 is positioned upwardly by a change in ratio between the flows through the conduits 1 and 2, contacts 58—59 engage, energizing winding 61 and causing the cam 64 to be positioned in a direction to restore the mid point 22 to the original or predetermined position. The movement of the motor 63 necessary to restore the mid point 22 to the original position is then a measure of the change in the ratio. Accordingly, as illustrated, the motor 63 is utilized to position the index 4 relative to the chart 3 and indicating scale 5.

The cam 64 may be shaped as will be appreciated by those skilled in the art to correct for any functional relation which may exist between changes in ratio between the flows through conduits 1 and 2 and movements of the link 29 necessary to restore the mid point 22 to the original position. Accordingly, chart 3 and scale 5 may if desired be uniformly graduated through proper shaping of the cam 64. That is, through proper shaping of the cam 64 equal movements of the index 4 may be made directly proportional to equal changes in the ratio of the flows between conduits 1 and 2.

It is further to be noted that the motor 63 being a synchronous self-starting motor, the time length of the electric impulses originated through closure of contacts 58—59 and 57—60 for equal changes in ratio between the flows through conduits 1 and 2 will likewise be equal. That is, the time length of such impulses is or may be taken as a measure of the change in ratio.

As in the embodiment of my invention shown in Fig. 1 I may, in instances where such is desirable, control the rate of flow through the conduit 1 to maintain a constant ratio between the rate of flow of fluid to the conduit 1 and that through the conduit 2. In Fig. 4 I show a valve 66 operated by a motor 67 having opposed windings. Closure of contacts 58—59 serve to energize one winding of the motor 67 and thus position the valve 66 in one direction. Conversely closure of contacts 57—60 serve to energize the opposed winding of the motor 67 and thus position the valve 66 in opposite direction. Accordingly, the valve 66 will be positioned upon departure of the ratio between the rates of flow in the conduits 1 and 2 to vary the rate of flow through the conduit 1 in a direction tending to restore the desired ratio.

In the embodiment of my invention shown in Fig. 4, the valve 66 may be operated to maintain a predetermined desired ratio by opening a switch 70 located in the common lead to motor 63. Thereafter the motor 63 will remain stationary, maintaining the link 20 in given position. Changes in ratio thereafter will affect closure of contacts 58—59 or 57—60 causing motor 66 to be positioned until the desired ratio is restored.

Similarly, the control apparatus shown in Fig. 4 may be rendered inoperative by opening a switch 71 located in the common lead to motor 67. Thereafter the ratio between the flows through conduits 1 and 2 will be exhibited but the conduit 1 will not be controlled.

Figure 5:
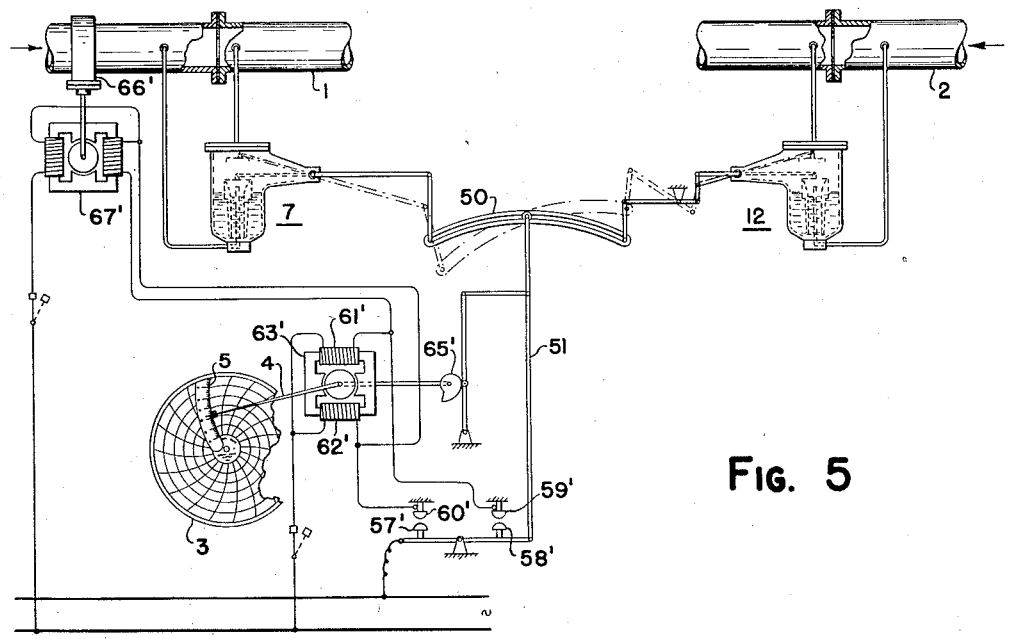
Fig. 5 shows diagrammatically a further form of my invention.

Fig. 5 represents a further embodiment of my invention incorporating certain features illustrated in Figs. 3 and 4. In Fig. 5 the meters 7 and 12 jointly position the arcuate link 50, as in Fig. 3. The depending member 51 is, however, positioned to maintain a predetermined vertical position through electrical means similar to that shown in Fig. 4.

As shown, upward movement of the member 51 serves to cause engagement of contacts 58', 59' whereas downward positioning of the member serves to effect closure of contacts 57' and 60'. Closure of contacts 58'—59' energize a winding 61' of a motor 63', which through a cam 65' positions the member 51 toward its original vertical position, and upon the member 51 being restored thereto contacts 58'—59' disengage. Conversely contacts 57' 60', upon closure, energize a winding 62' and effect opposite rotation of the motor 63', which serves to position the member 51 in proper direction to disengage contacts 57'—60' when it is restored to the original position. The index 4 is positioned by the motor 63' to record the ratio on the chart 3 and indicate the ratio relative to a suitable scale 5.

The rate of flow of fluid through the conduit 1 may be varied by means of a valve 66' so actuated by means of contacts 58'—59' and 57'—60' to maintain a substantially constant ratio between the rates of flow of fluid through the conduits 1 and 2. As shown, engagement of contacts 58'—59' serves to energize one winding of a motor 67', whereas closure of contacts 57'—60' serves to energize the opposed winding of the motor. Accordingly, the motor is positioned in one direction or another selectively in dependence upon closure of contacts 58'—59' or 57'—60' to position the valve 66' to maintain a substantially constant ratio between the rate of flow of fluid through the conduit 1 and that through the conduit 2.

It is apparent that in any of the embodiments of my invention shown any desired range in ratios may be measured. For example, the arcuate slot in drive arm 11 may be of such design that a change in ratio of from 0.5 to 1.5 is required to position the link 20 from one end to the other. By changing the size of the orifice 8 relative to the size of the orifice in conduit 2 so that a greater or lesser flow is required to position the meter 7 through its travel the range in ratios through which my device is operative may be easily changed to meet the particular conditions pertinent to any particular case. As will be readily appreciated by those familiar with the art, in the event that from time to time material changes in the basic ratio between the flows through conduits 1 and 2 occur, the orifice 8 may be made adjustable so that upon such changes in the basic ratio the size of the orifice 8 may be varied to maintain the apparatus within its operative limits.

While I have described certain specific embodiments of my invention it will be apparent that further modifications may be made without departing from its spirit or scope, and that therefore such embodiments of my invention as I have chosen to describe should be taken as merely illustrative and not as limiting.

What I claim as new, and desire to secure by Letters Patent of the United States, is:

1. Apparatus for determining the ratio between two variables, comprising a first member angularly displaced from an initial position in accordance with the magnitude of one of said variables whereby a given point on said member has a displacement from an initial position proportional to the product of the magnitude of the variable and its radial distance from the center of angular displacement of said member, a second member angularly displaced from an initial position in accordance with the magnitude of the second variable, means for determining the point on said second member having the same displacement as said given point on said first member, means under the control of said members for operating said last named means, and measuring means of the radial distance of said point on said second member from the center of angular displacement of said second member.

2. In apparatus for determining the ratio between two variables; in combination, a first pressure responsive device positioned in accordance with changes in the magnitude of one of said variables, a first drive arm angularly positioned about a fixed pivot by said first named device, a second pressure responsive device positioned in accordance with changes in the magnitude of the other of said variables, a second drive arm angularly positioned about a fixed pivot by said second device, a member having a neutral position jointly positioned by said first and second arms, means for varying the length of one of said arms, means under the control of said member for operating said last named means to maintain said member in the neutral position, and exhibiting means actuated by said last named means positioned in accordance with the relative lengths of said arms.

3. Apparatus for determining the ratio between two variables, comprising in combination, a first arm angularly positionable about a center in accordance with changes in the magnitude of one of said variables, a second arm angularly positionable about a center in accordance with changes in the magnitude of the other of the variables, a member having a neutral position and displaced therefrom in accordance with the differences in the displacement of said arms, means for varying the length of one of said arms, means controlled by said member for operating said last named means to restore said member to the neutral position after departure therefrom, and means actuated by said last named means moving in functional relation to changes in the length of said drive arm.

4. In combination, a first arm angularly displaceable about a center from on initial position in accordance with the magnitude of a first variable, a second arm angularly displaceable about a center from an initial position in accordance with the magnitude of a second variable, a differential member pivotally connected to said first arm a fixed distance from its center of rotation, and pivotally connected to said second arm a variable distance from its center of rotation, means pivotally connected to said differential member having a neutral position, and means actuated by said last named means for varying the distance of the pivot connection to said second arm from its center of rotation to restore said member to the neutral position after departure therefrom.

5. In combination, a first arm angularly displaceable about a center from an initial position in accordance with the magnitude of a first variable, a second arm angularly displaceable about a center from an initial position in accordance with the magnitude of a second variable, a differential member pivotally connected to said first arm a fixed distance from its center of rotation and pivotally connected to said second arm a variable distance from its center of rotation, means actuated by said differential member for establishing a fluid pressure proportional to changes in the position of a point thereon from a predetermined position, and means actuated by said fluid pressure for varying the distance of the pivot connection to said second arm from its center of rotation to maintain said fluid pressure at a predetermined value.

6. Apparatus for determining the ratio between two variables comprising, in combination, a floating beam, means for displacing one end of said beam proportional to the magnitude of one of said variables, means for displacing the other end of said beam proportional to the magnitude of the other of said variables, means for varying the proportionality between the magnitude of one of said variables and the corresponding displacement of one end of said beam, a member connected to said beam having a neutral position, and means controlled by said member for selectively operating said last named means to restore said member to the neutral position after departure therefrom.

7. In an apparatus for determining the ratio between two variables in combination, a floating beam, means for displacing one end of said beam proportional to the magnitude of one of said variables, means for displacing the other end of said beam proportional to the magnitude of the other of said variables, a movable member for varying the proportionality between changes in one of said variables and the corresponding displacement of said beam, a motor having opposed windings, a cam positioned by said motor for positioning said member, a contact controller having a neutral position connected to a point on said beam for selectively energizing the windings of said motor to position said movable member to restore said controller to the neutral position, and indicating means actuated by said motor movable in functional relation to movements of said member.

8. Apparatus for determining the ratio between two variables comprising in combination, a floating differential beam jointly positioned in one plane proportional to the magnitude of each variable, a contact controller having a neutral position, a movable connection from said controller to said beam, and electromagnetic means under the control of said controller for moving said connection relative to said beam to maintain said controller in the neutral position.

9. In an apparatus for determining the ratio between two variables in combination, a floating differential beam, means for positioning a first point on said beam about a second point as a center proportional to the magnitude of one variable, means for positioning the second point on said beam about the first point as a center proportional to the magnitude of the other of said variables, a movable member pivotally connected to said beam and adapted to be positioned along said beam between said first and second points, a contact controller having a neutral position movable by said member, a motor having opposed windings selectively energized by said controller dependent upon the sense of departure of said controller from the neutral position, an indicator positioned by said motor, and a cam positioned by said motor for positioning said member along said beam and shaped to move said member in desired functional relation to movements of said indicator.

10. Apparatus for determining the ratio between two quantities, comprising a member having a neutral position, mechanical means actuated by said quantities for displacing said member from the neutral position in proportion to changes in the ratio between said quantities, means for varying the proportion between changes in said quantities and displacements of said member from the neutral position and means under the control of said member for operating said last named means to vary said proportion to maintain said member to the neutral position whereby the change in proportion is a measure of the change in ratio between said quantities.

11. Apparatus for determining the ratio between two quantities, comprising in combination, a member having a neutral position, a first lever for displacing said member in one direction from the neutral position in proportion to the magnitude of one quantity, a second lever for displacing said member from the neutral position in opposite sense in proportion to the magnitude of the other quantity, means for varying the moment arm of one of said levers, and means under the control of said member for operating said last named means to maintain said member in the neutral position whereby the ratio of the moment arms of said levers is a measure of the ratio of said variables.

12. Apparatus for determining the ratio between two variables, comprising in combination, a first member positioned in accordance with the magnitude of one variable, a second member positioned in accordance with the magnitude of the other variable, a third member having a neutral position, a mechanical differential means under the joint control of said first and second members for positioning said third member and including means for relatively varying the movement of said third member produced by given movements of the first and second members, and means under the control of said third member for regulating said last named means to maintain said third member in the neutral position.

13. Apparatus for determining the ratio between two variables, comprising in combination, a floating differential beam jointly positioned proportional to the magnitude of each variable, a member having a neutral position, a movable connection from said member to said beam, and means under the control of said member for moving said connection relative to said beam to maintain said member in the neutral position.

14. In an apparatus for determining the ratio between two variables, in combination, a floating differential beam, means for positioning a first point on said beam about a second point as a center proportional to the magnitude of one variable, means for positioning the second point on said beam about the first point as a center proportional to the magnitude of the other of said variables, a movable link pivotally connected to said beam and adapted to be positioned along said beam between said first and second points, a member having a neutral position connected to said link, and means under the control of said member for positioning said link along said beam to maintain said member in the neutral position.

15. In apparatus for determining the ratio between two variables, in combination, a first member positioned in accordance with the magnitude of one variable, a second member positioned in accordance with the magnitude of the other variable, a third member having a neutral position, a mechanical differential means under the joint control of said first and second members for positioning said third member and including means for relatively varying the movement of said third member produced by given movements of the first and second members, and fluid pressure operated means under the control of said third member for regulating said last named means to maintain said third member in the neutral position.

HARVARD H. GORRIE.